US007779383B2

(12) United States Patent
Bornhoevd et al.

(10) Patent No.: US 7,779,383 B2
(45) Date of Patent: Aug. 17, 2010

(54) COMPOSITION MODEL AND COMPOSITION VALIDATION ALGORITHM FOR UBIQUITOUS COMPUTING APPLICATIONS

(75) Inventors: Christof Bornhoevd, San Franscisco, CA (US); Artin Avanes, Berlin (DE); Holger Robert Ziekow, Berlin (DE)

(73) Assignee: SAP AG, Walldorf (DE)

( * ) Notice: Subject to any disclaimer, the term of this patent is extended or adjusted under 35 U.S.C. 154(b) by 1118 days.

(21) Appl. No.: 11/292,203

(22) Filed: Dec. 1, 2005

(65) Prior Publication Data

US 2007/0168925 A1  Jul. 19, 2007

(51) Int. Cl.
*G06F 9/44* (2006.01)
(52) U.S. Cl. .................. 717/104; 717/105; 717/107; 717/120
(58) Field of Classification Search ............ 717/104, 717/107, 120, 105
See application file for complete search history.

(56) References Cited

U.S. PATENT DOCUMENTS

| 7,069,204 | B1 * | 6/2006 | Solden et al. ............. 703/14 |
|---|---|---|---|
| 2004/0220998 | A1 * | 11/2004 | Shenfield et al. ........... 709/201 |
| 2005/0060048 | A1 * | 3/2005 | Pierre et al. .................. 700/28 |
| 2005/0113092 | A1 * | 5/2005 | Coppinger et al. .......... 455/436 |
| 2005/0235274 | A1 * | 10/2005 | Mamou et al. .............. 717/136 |
| 2005/0278047 | A1 * | 12/2005 | Ahmed ....................... 700/97 |
| 2007/0101242 | A1 * | 5/2007 | Yancey et al. ............... 714/776 |
| 2007/0168925 | A1 * | 7/2007 | Bornhoevd et al. ......... 717/104 |
| 2007/0239717 | A1 * | 10/2007 | Thrash et al. ................ 707/7 |

FOREIGN PATENT DOCUMENTS

| JP | 62-267842 | A2 | 11/1987 |
| JP | 2001216142 | A2 | 8/2001 |
| JP | 2001325103 | A2 | 11/2001 |
| WO | 99/06907 | A1 | 2/1999 |
| WO | 2005/109129 | A1 | 11/2005 |

OTHER PUBLICATIONS

Ketfi et al, "Model-Driven Framework for Dynamic Deployment and Reconfiguration of Component-Based Software Systems", Nov. 2005, ACM, pp. 1-9.*
Shen et al, "Towards a Unified Formal Model for Supporting Mechanisms of Dynamic Component Update", Sep. 2005, ACM, pp. 80-89.*
Gokhale et al, "Applying Model-Integrated Computing to Component Middleware and Enterprise Applications", Oct. 2002, ACM, pp. 65-70.*
Deng, "Supporting Configuration and Deployment of Component-based DRE Systems Using Frameworks, Models, and Aspects", Oct. 2005, ACM, pp. 152-153.*
Deng et al, "Model-driven Integration of Federated Event Services in Realtime Component Middleware", 2004, ACM, pp. 353-356.*
Schmid et al, "A Middleware-Independent Model and Language for Component Distribution", Sep. 2005, ACM, pp. 83-89.*
Mei et al, "A Software Configuration Management Model for Supporting Component-Based Software Development", Mar. 2001, ACM. pp. 53-58.*

(Continued)

*Primary Examiner*—Wei Y Zhen
*Assistant Examiner*—Charles Swift
(74) *Attorney, Agent, or Firm*—Brake Hughes Bellermann LLP

(57) ABSTRACT

Modeling a component-based application includes modeling communication capabilities of components of the application, modeling a plan for interlinking components of the application, modeling communications capabilities of a compound component composed of a plurality of constituent components, and determining if interlinked components are compatible to communicate validly in the application.

14 Claims, 11 Drawing Sheets

OTHER PUBLICATIONS

Dolbec et al, "A Component Based Software Reliability Model", Aug. 15, 1995, ACM, pp. 1-10.*

Armstrong, Rob, et al., "Toward a Common Component Architecture for High-Performance Scientific Computing", http://www-unix.mcs.anl.gov/~curfman/web/cca_paper.html#node14, (Dec. 1, 2005), 18 pages.

Genssler, Thomas, et al., "PECOS in a Nutshell", *PECOS Project*, (Sep. 16, 2002), 77 pages.

Heinzelman, Wendi B., et al., "Middleware to Support Sensor Network Applications", *IEEE Netw. Mag. Special Issue*, (2004), 26 pages.

Liang, Vei-Chung, et al., "A Port Ontology for Automated Model Composition", *Proceedings of the 2003 Winter Simulation Conference*, (2003), pp. 613-622.

Mascolo, Cecilia, et al., "XMIDDLE: A Data-Sharing Middleware for Mobile Computing", *2001 Kluwer Academic Publishers*, (Aug. 31, 2001), 32 pages.

Murphy, Amy L., et al., "LIME: A Middleware for Physical and Logical Mobility", *IEEE International Conference on Distributed Computing*, (2001), 10 pages.

Office Action for Japanese Patent Application No. 2006-325754 (includes English Translation), mailed on Jan. 29, 2010, 13 pages.

* cited by examiner

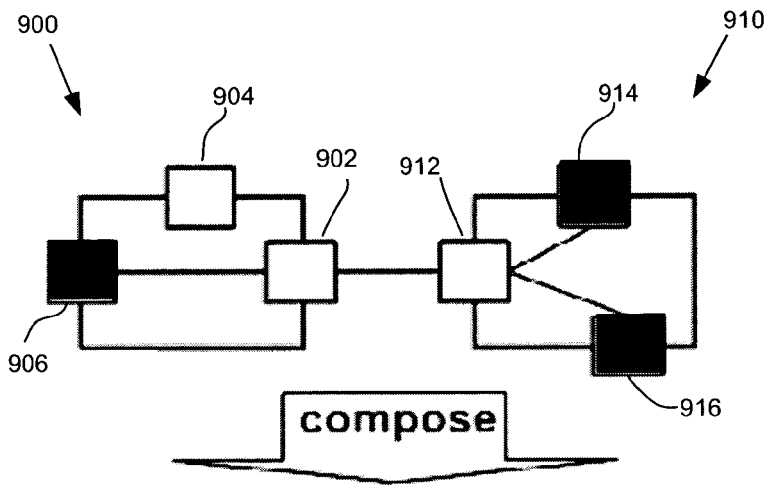
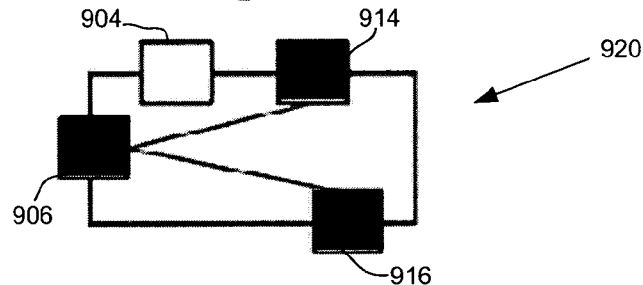
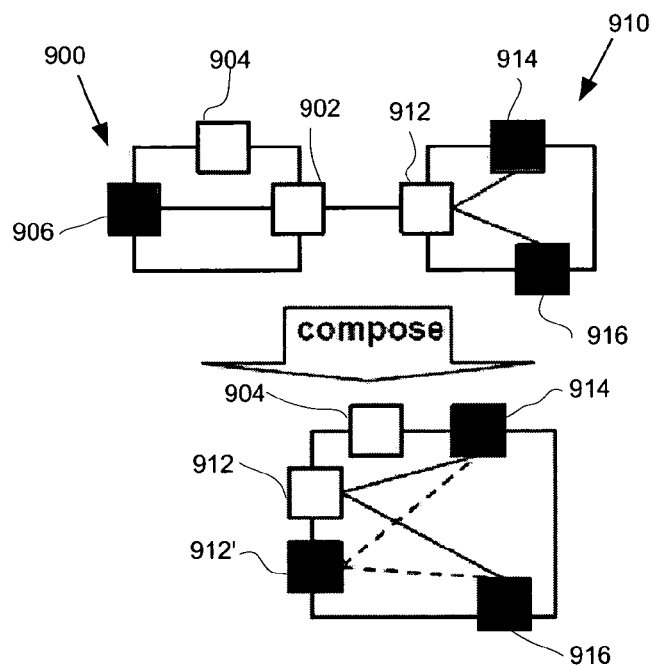
FIG. 9A
FIG. 9B

COMPOSITION MODEL AND COMPOSITION VALIDATION ALGORITHM FOR UBIQUITOUS COMPUTING APPLICATIONS

TECHNICAL FIELD

This description relates to ubiquitous computing technologies.

BACKGROUND

In a ubiquitous computing environment, many different computing technologies are integrated into the environment of human beings and provide useful services to humans in their day-to-day lives at work or at home. Such environments relate to systems and infrastructures known as "Smart Items Technology," "Intelligent Ambience," or "Wearable Computing."

In ubiquitous computing applications environments of highly distributed applications run in the form a variety of cooperating, heterogeneous devices (e.g., PDAs, smart phones, sensor devices, RFID tags, embedded devices, PC's, servers, GPS satellites, computing networks, telephones, televisions, etc.) or services (e.g., various software programs, routines, platforms, and executable code) using a variety of different communication technologies and protocols to exploit their computing capabilities. Individual devices run components or services that can be combined, i.e., "composed," into more complex services or applications. Such a component- or service-based approach to the development of ubiquitous applications supports the distribution of functionality across the set of available devices, enables better reusability of components in different/new applications, and supports the development of ubiquitous applications by dividing the overall functionality into multiple components with clearly defined interfaces that can be developed and tested separately.

An example of a ubiquitous computing environment is a smart items infrastructure ("SII"). Smart item technologies may include, for example, radio-frequency identification (RFID) systems, embedded systems, or sensor networks, and may be used, for example, to provide business software applications with fast access to real-world data. For example, smart item technologies may be used to support the detection, reading, or writing of RFID tags, as well as to support communication with, and control of, wireless sensor networks and embedded systems. In many instances, smart items may include devices having local processing power, memory, and/or communication capabilities that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart item devices include an RFID tag, which may be passive or active, and which may be attached to an object and used to provide product or handling information related to the object. Other examples of smart item devices includes various sensors, such as, for example, environmental sensors (e.g., a temperature, humidity, or vibration sensor), which may be capable of communicating with each other in one or more sensor networks. These and other types of smart item devices also may include embedded systems, which may refer generally to any system in which a special-purpose processor and/or program is included, and/or in which the system is encapsulated in the device being controlled.

Through automatic real-time object tracking, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

SUMMARY

In a first general aspect, a method of modeling a component-based application includes modeling communication capabilities of components of the application, modeling a plan for interlinking components of the application, modeling communications capabilities of a compound component composed of a plurality of constituent components, and determining if interlinked components are compatible to communicate validly in the application.

Implementations can include one or more of the following features. For example, the components can include software modules or heterogeneous computational devices (e.g., RFID devices). The method can further include determining if the compound component is well-formed. Modeling communication capabilities of components of the application can include mapping a communication concept to a property associated with the component.

The method can include modeling end-to-end communications concepts of components at ends of a communications pathway through interlinked components and determining if the end-to-end communications concepts of the components at the ends of the pathway are compatible. Modeling communication capabilities of components of the application can include generating a model of an interface port of the component. Modeling communications capabilities of a compound component composed of a plurality of constituent components can include merging models of interface ports of the constituent components. Modeling communication capabilities of components of the application can include modeling communication capabilities of types of components and determining if interlinked components are compatible to communicate validly in the application can include determining if the communication technologies modeled by the types of components are compatible. Modeling communication capabilities of components of the application can include modeling communication capabilities of instances of components, and determining if interlinked components are compatible to communicate validly in the application can include determining if the instances of components are compatible. The method can include associating a communication capability with an OSI layer.

In another general aspect, a system for modeling a component-based application includes a storage device and a processor. The storage device includes models of communication capabilities of components of the application and a model of a plan for interlinking components of the application. The processor is configured to model communications capabilities of a compound component composed of a plurality of constituent components and to determine if interlinked components are compatible to communicate validly in the application.

Implementations can include one or more of the following features. For example, the components can include heterogeneous computational devices (e.g., RFID devices). The processor can be further configured to determine if the compound component is well-formed. The storage device can further comprise models of end-to-end communications concepts of components at ends of a communications pathway through interlinked components, and the processor can be further configured to determine if the end-to-end communications concepts of the components at the ends of the pathway are compatible. The processor can be further configured to generate a model of an interface port of the component, and the processor can be further configured to merge models of interface ports of the constituent components to model communications capabilities of the compound component.

The processor can be configured to model communication capabilities of types of components to model communication capabilities of the components of the application, and the processor can be configured to determine if the types of components are compatible to determine if the interlinked components are compatible to communicate validly in the application.

The processor can be configured to model communication capabilities of instances of components to model communication capabilities of components of the application, and the processor can be configured to determine if interlinked components are compatible to communicate validly to determine if the instances of components are compatible.

The details of one or more implementations are set forth in the accompanying drawings and the description below. Other features will be apparent from the description and drawings, and from the claims.

BRIEF DESCRIPTION OF THE DRAWINGS

FIG. 9A is a flow-chart of a process for composing a composite application from constituent components.

FIG. 9B is a flow-chart of a process for composing a composite application from constituent components.

DETAILED DESCRIPTION

Figure 1:
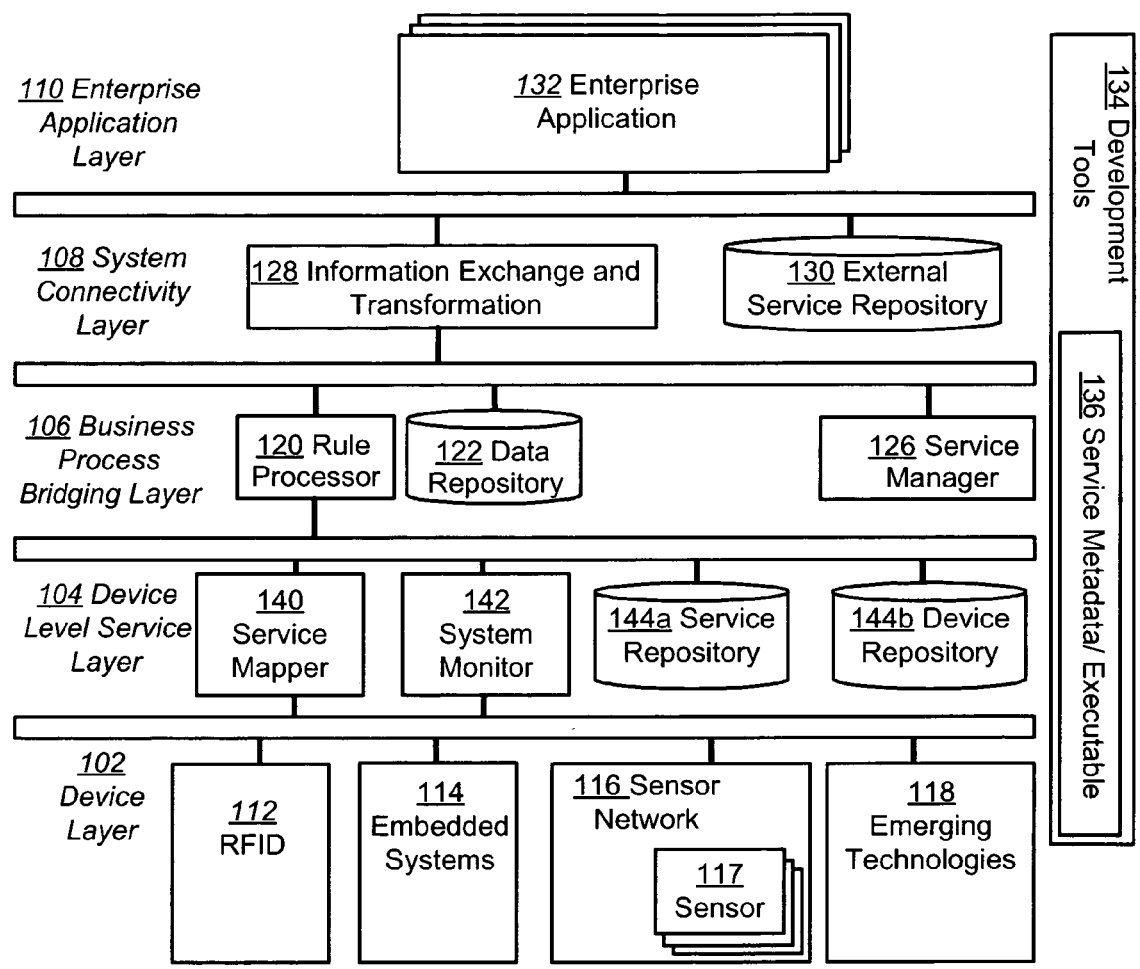
FIG. 1 is a block diagram of a smart items infrastructure in which a composition model and validation scheme can be utilized.

As described herein, a composition model is described for service- or component-based applications distributed over smart devices. Also, a validation scheme for validating proposed composition plans is described. The model can be used to understand if and how heterogeneous components can be linked together into a ubiquitous computing system.

The primary building blocks of the model used to assemble composite applications are components representing software services and modules, computational devices, and communication middleware. In the model, each component has an interface defined by its ports, and the ports hold rich descriptions about the communication technologies used by the component. A port may be part of the interface to a component's functionality or it may delegate connections to another port. The components are described by referring to classes of communication aspects modeled in an interface ontology that is part of the model framework.

In the ontology used in the model, classes organized in subclasses and superclasses and constraints given by the ontology enable descriptions of the network on different levels of granularity. Furthermore, semantic relations between communication aspects at different layers are modeled. With this information, application constraints regarding communication strategies can be specified and considered in the validation process, and the ontology can be extended to cover future communication technologies domains based on a meta-model used to define domain-specific ontologies.

In a composition plan that describes a composite application, components are interlinked via their ports, and the model of the composite application is derived from the plan by successively applying a composition operation on the models of interlinked building blocks. At each step, the composition operation takes two linked components as input and creates the model of the resulting composite component. The communication technologies provided and required by the linked components are used to derive the capabilities and restrictions of the resulting composite component.

To check the well-formedness of a composite component, the composition operation checks if both linked ports define all communication concepts they need for interaction. Examples of such communication concepts are protocols, radio frequencies, or means for error correction. The concepts required to be employed can be derived depending on which kind of components are interlinked and the properties of the involved components. Thus, port-to-port interaction can be validated by evaluating the presence and compatibility of the required communication aspects.

In addition to interaction technologies realizing point-to-point connectivity, aspects of end-to-end communication can also be checked by describing the aspects of ports at the end points of the communication. The composition operation can be in charge of creating an equivalent constraint on an arbitrary level of communication abstraction in the communication network, which is added to the ports in the resulting component that are involved in the end-to-end connection.

The primary output of the composition operation is a model of the resulting composite component. In addition, information is included if the composition is sufficiently defined or if additional components are needed to build up a working orchestration of components. In addition, if the composition is invalid, the composition component can return information about the cause of failure.

FIG. 1 is a block diagram of a smart items infrastructure 100 in which a composition model and validation scheme can be utilized. The smart items infrastructure 100 includes a device layer 102, a device level service layer 104, a business process bridging layer 106, a system connectivity layer 108, and an enterprise application layer 110. The device layer 102 may be considered to contain various devices that communicate using various different hardware, software, and communication protocols, across a number of groups, local networks and/or physical locations. Meanwhile, the layers 106, 108, and 110 may be considered to be part of, or associated with, a business data processing system or service.

The device layer 102 thus comprises the actual smart item devices, as well as any communications between them. The device layer 102 also is responsible for presentation of any offered hardware services to the next higher layer, the device level service layer 104. The devices may include, for example, an RFID device 112, embedded systems 114, sensor networks 116, and any other new or emerging technologies 118, as would be appropriate.

For example, for the RFID device(s) 112, mobile tags may be attached to real-world objects, and are then read (and optionally written to) by RFID readers. In an implementation using active tags, the active tags may also provide additional sensor data (e.g., a current value or a past value). In RFID, communication is typically initiated by the reader, while tags may or may not directly communicate with each other. Such an RFID reader may be configurable to the extent of processing tag data, e.g., may be configured to perform verification of written data, or to avoid reporting a disappearance of a tag if the ostensibly lost tag in fact reappears within a given time window.

Techniques for communicating with the embedded systems 114 may vary with the types of devices of the embedded systems. For example, the embedded systems may represent anything from small-scale, one-chip microcomputers, all the way to full-blown PC hardware. Thus, for example, for devices that have the capabilities of a mobile phone or more (e.g., are able to run a Java Virtual Machine™), implementation may be performed in Java™ or based on OSGi. As also described herein, the sensor networks 116 may include any number of types of sensors that may include integrated processing power and that may be able to execute peer-to-peer communication.

In another example, when the device layer 102 comprises a wireless sensor network 116, it can include features that need to be managed. For example, sensor nodes 117 in the network can include integrated processing power that enables peer-to-peer communication, such that simple business logic can be executed by the sensor nodes 117. To control the behavior of the nodes 117, program logic can be pushed down to them from higher levels of the infrastructure 100. Lightweight services that can be implemented in different device type-specific ways can be used to encapsulate and deploy this program logic on the sensor nodes 117. The basic functionality that each hardware platform provides can be encapsulated in so-called "enabling services" to allow unified and simplified access to the sensor nodes using the service interfaces. Other services (e.g., management and business services) can be installed and run on the sensor nodes 117. Generally, management and business services are instantiated at run-time after being received on the nodes 117 from higher levels of the infrastructure 100. The service that controls the reception and instantiation of the management and business services is an enabling service and typically is pre-installed on the nodes 117.

The device level service layer 104 manages the deployable services used by the device layer 102. Thus, the layer 104 includes a service mapper 140, the system monitor 142, and the service repository 144a and the device repository 144b.

The service repository 144a and the device repository 144b may store at least two kinds of services and devices—compound and atomic services and devices. The compound services generally rely on other services to fulfill their tasks, and may have no directly-executable code of their own; rather, the compound services may include an executable service composition description that is stored in a corresponding service description. Thus, compound services may have one service executable, i.e., the service composition description. In contrast, atomic services do not generally use other services, and have their own directly-executable code. Also, because an atomic service may be deployable on different platforms, an atomic service may have more than one service executable, e.g., may have a service executable associated with each of the different platforms. Similarly, atomic devices generally are stand-alone devices, whereas compound devices are composed of two or more constituent atomic devices.

The service and the device repositories 144 also may store the service and device metadata, where such service metadata is described in detail, and may include a service or device name, identifier, version, or vendor, or may describe run-time requirements of the service or device, including, for example, technical deployment requirements (e.g., high bandwidth, or minimum processing power required), semantic requirements (e.g., that a receiving device have a serial connection, have a battery backup to the normal line power, and/or many device neighbors), and spatial requirements (e.g., that a receiving device be in the basement, or at a south side of a specified building).

At run-time, the system monitor 142 monitors a current system state. Whether and how any part of a state of a service is exposed to the system monitor may be set by a developer of the service at design-time. This state-availability information is thereafter available both to a system administrator and to the service mapper 140 component. As also described above, the service mapper 140 receives deployment requests and then determines on which device(s) the corresponding service should be deployed, e.g., by matching the service metadata to the device metadata, which may include a current state of the smart item devices and related local network(s). As also described herein, the service mapper 140 also may react to certain events or conditions, including changes in the network state (as recognized by the system monitor 142), and may thereafter decide to re-map a service or add or remove instances of services to better fulfill given deployment requests/requirements.

The business process bridging layer 106 includes services designed to aggregate data from the devices at the device layer 102, provided via the device level service layer 104, and to transform the data from the device layer 102 into business-relevant information. In so doing, an amount of data sent to back-end enterprise application systems may be reduced, and business logic may be executed for different ones of the enterprise application systems.

For example, one or more rule processors 120 may be used to parse incoming messages, support basic operational services (e.g., item movement, association, de-association, or device reading/writing) and support information querying. The rule processor 120 processes user-defined business rules that define or reference any other basic operational services that should be executed or consulted. Using such rules and basic operational services provides a flexible framework to adapt the system 100 to different business scenarios.

The rule processor 120 may use a data repository 122 for keeping track of all physical objects of interest, e.g., for keeping track of the current state, location, timestamp, or an associated business transaction of a given object being tracked, as well as for keeping track of what future actions are expected. Aggregated information from the data repository 122 may be reported on a regular basis, e.g., daily or monthly.

One example of an operation of the layers 102, 104, and 106 includes a "goods receiving" scenario. For example, a provider delivering objects to a receiver may send an Advanced Shipment Notification (ASN) containing a list of all objects in the shipment, along with object identifiers such as Electronic Product Codes (EPCs). The ASN may be stored in the data repository 122. When the shipment arrives and passes the RFID readers at the device layer 102, e.g., at a receiving dock door, then the EPCs are read by the RFID readers, and sent to the rule processor 120. The rule processor looks up the ID of the reader from which the message came, determines a location and role of the reader, and then calls the appropriate basic operational service responsible for handling received shipments. This operational service compares the obtained EPCs with the expected EPCs from previous ASNs, and, if a match is found, reports to an enterprise application 132 that the delivery has arrived and is complete. The executed operational service also may then update the data in the data repository 122. Services described above, as well as services for receiving and sending the involved messages, may be managed by a service manager 126.

Components in the system connectivity layer 108 may be used to connect different application systems and to support system and data integration. For example, messages and data may be routed to the correct backend systems by an information exchange and transformation module 128, and also may be transformed thereby to enable a semantically-correct integration. On top of message-routing and transformation services, the system connectivity layer 108 also may contain an external service repository 130. An external service description may be registered with the external service repository 130 when a given SII service is deployed from a development environment to the service repository 144a or the device repository 144b of the device level service layer 104. The repository 130 contains a registry of all services offered by the infrastructure 100 that are accessible from outside of the infrastructure 100.

The enterprise application layer 132 includes, for example, traditional enterprise IT systems responsible for controlling and managing enterprise business applications. An enterprise application covering a specific business process may not be a single program, but rather may be composed of different services that work together to achieve a desired functionality. Such services may be provided by the same enterprise system, by another enterprise system within the enterprise application layer 110 (possibly located at a site of a business partner), or by systems from lower layers (e.g., by smart item devices at the device layer 102).

Finally in FIG. 1, development tools 134 may refer to tools for creating enterprise application(s) 132 and other applications/services. Using a development environment integrated with the infrastructure 100 may support the implementation of basic services in manners that are similar to known development tools in the enterprise application space. Further, the development tools 134 may allow the creation of the required service metadata, as well as the inclusion of existing services into new applications. In one embodiment, the validation procedure can be implemented as a design-time tool available as such a development tool 134. Furthermore, the development tools 134 allow a developer to specify where a certain service should run, to configure individual service instances, and to deploy the services in a desired manner. That is, a developer may develop service metadata/executable(s) 136 using the development tools 134, and may then provide desired ones of the service and device metadata/executable(s) 136 for storage in the service repository 144a and the device repository 144b, and/or for mapping/re-mapping by the service mapper 140 at the same or later time.

Within the infrastructure 100 shown in FIG. 1, many different individual devices and services (generally known herein as "components") can be linked together. FIG. 1 shows one example of a ubiquitous computing infrastructure, but other infrastructures also can be composed from many heterogeneous components. The different components may communicate using different technologies and protocols, which are described with respect to FIG. 2.

Figure 2:
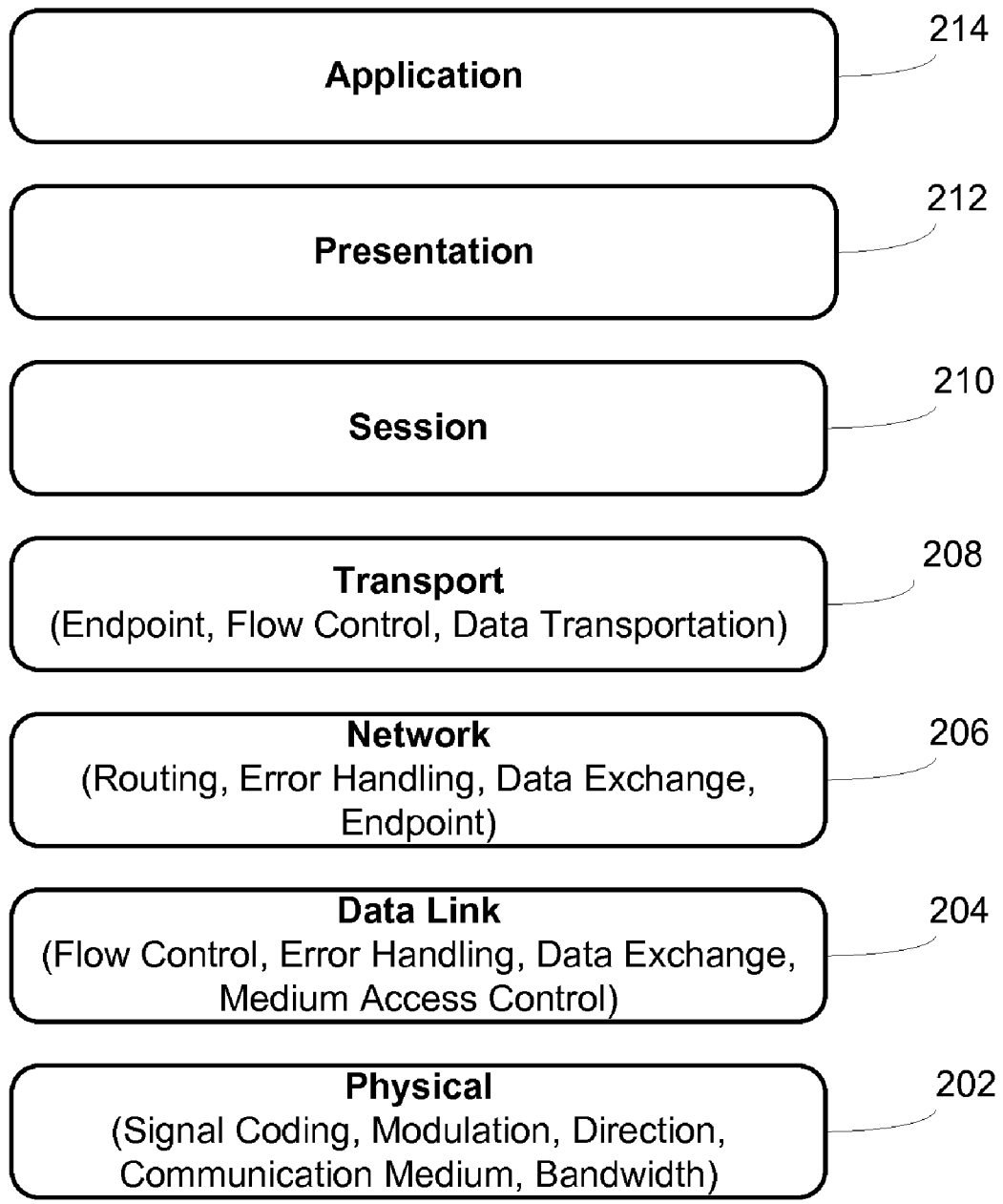
FIG. 2 is a block diagram of the Open Systems Interconnection ("OSI") model of device communication.

FIG. 2 is a schematic representation of the Open Systems Interconnection ("OSI") model 200 of device communication, in which seven layers of communication are defined. For components of an infrastructure to exchange data within the infrastructure, they must be able to communicate on all seven layers of abstraction shown in FIG. 2.

Figure 3:
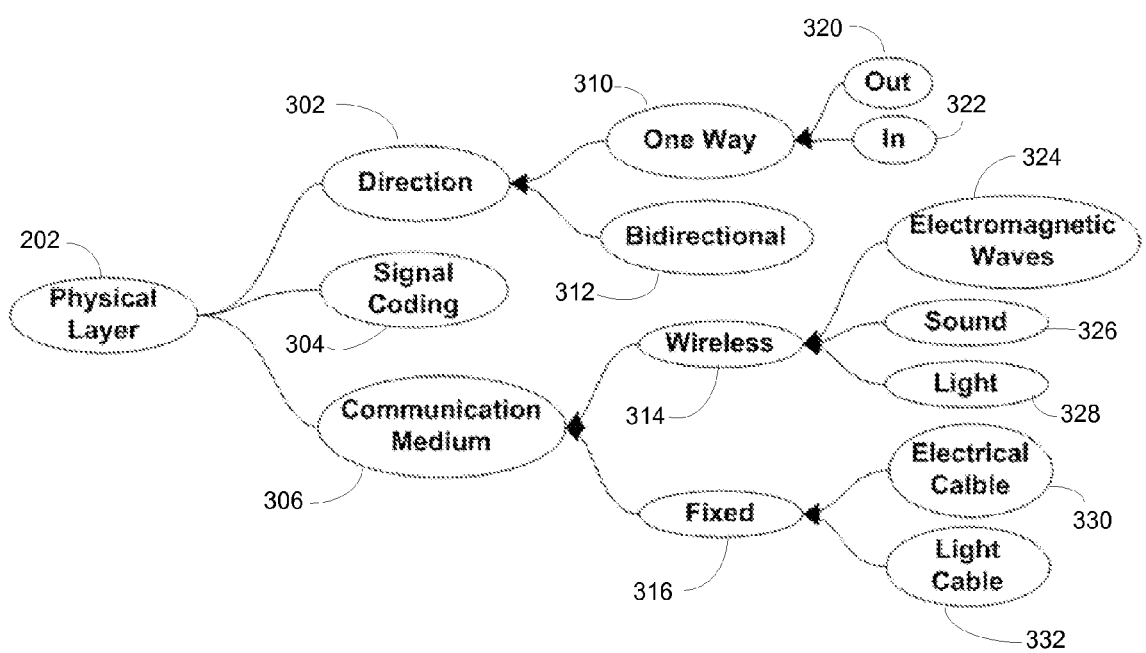
FIG. 3 is a block diagram of selected communications concepts used to describe the physical layer of an application in terms of ontology classes.

The physical layer 202 is the lowest layer in the OSI model 200. At the level of the physical layer 202, communication interfaces such as electrical standards and timing issues are defined. As shown in FIG. 3, in the physical layer 202 coarse grained properties of a component can be defined in terms of ontology classes such as "Direction" 302, "Signal Coding" 304, and "Communication Medium" 306 and integrated into a model of the physical layer for the component. The model of the physical layer of the component may be stored in the form of metadata associated with the component. Information about properties of the physical layer of a component can be further defined in terms of classes and subclasses. The classes and subclasses for a component can be arranged in a tree structure, such that higher levels of the tree inherit information defined in subclasses. Thus, in one example, information in the physical file layer about a component may indicate that the component uses a wireless communication medium and that EM waves are used to carry the signals.

The "Direction" class 302 can be a high-level class addressing the direction of information flow on the physical level for a component. The Direction of the component's communication can be defined in terms of ontology subclasses such as "One-Way" 310 and "Bidirectional" 312 and if the direction of communication is one-way then Direction of communication can be further defined in terms of ontology subclasses such as "In" 320 and "Out" 322. Instantiations of the Direction class for a component may not be reflexive regarding compatibility with another component. For example, a one-way outgoing communication port cannot be plugged to another port of the same kind because the second port cannot receive information from the first one, since both ports can only send but cannot receive.

The "Signal Coding" class 304 can define how a signal (e.g., a binary 0) is coded in the transmission. For example, the binary value of a signal can be determined based on whether an electrical value of the signal is over or under a certain threshold, and this can be modeled in subclasses of "Signal Coding."

The compatibility of two components may depend on the values defined for their "Communication Medium" class 306. For example, depending on mobility requirements of a component, devices having fixed cable links may be acceptable or not. Thus, the "Communication Medium" class can be defined in terms of the subclasses "Wireless" 314 and "Fixed" 316, which may be further defined, respectively, in terms of the subclasses, "EM Waves" 324, "Sound" 326, and "Light" 328 and in terms of the subclasses "Electrical Cable" 330 and "Light Cable" 332. Additionally, if certain frequencies for wireless communication are required, a "Frequency" can be defined as a subclass of either or both the "Wireless" and "Fixed" subclasses 314 and 316.

Figure 4:
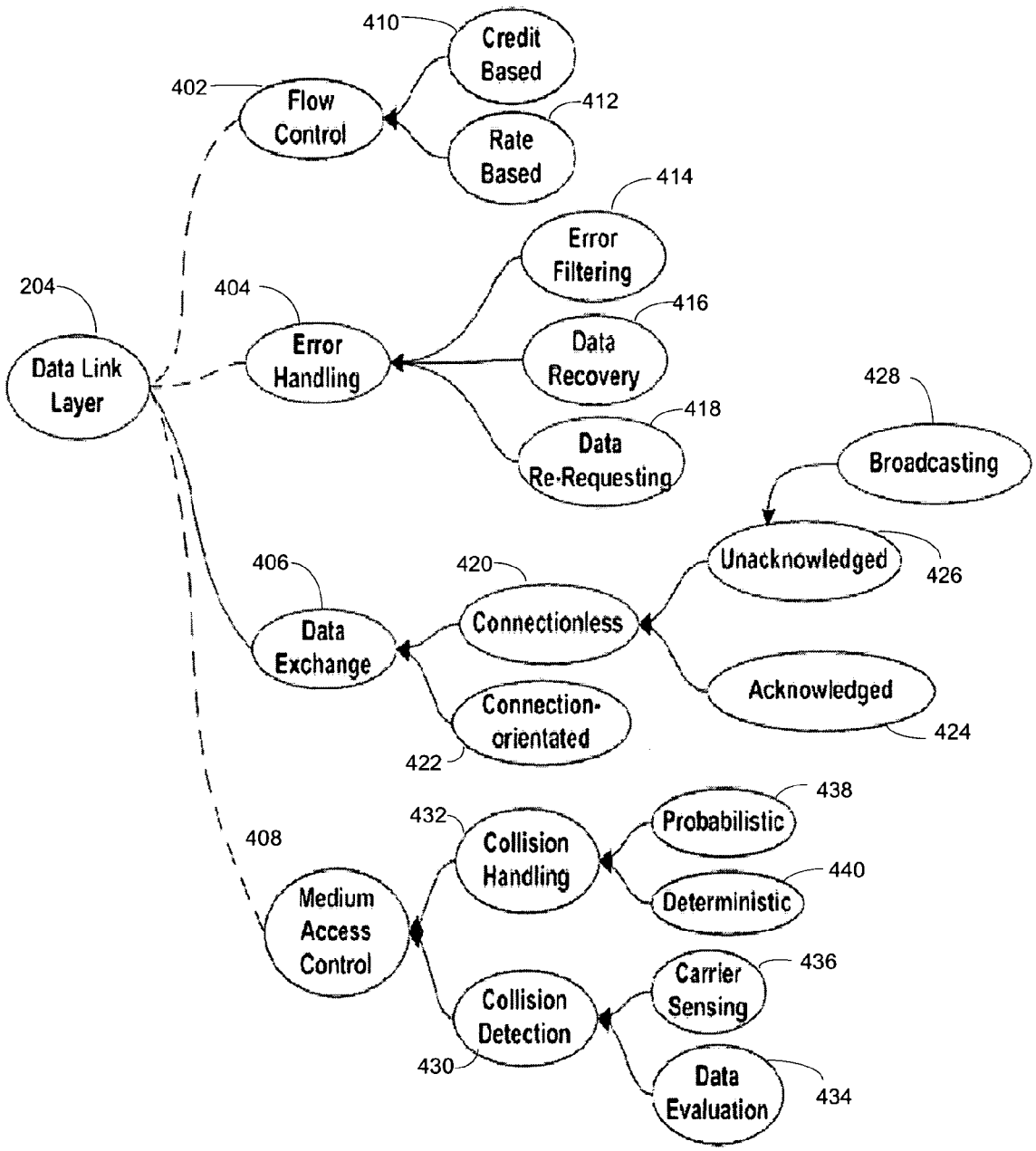
FIG. 4 is a block diagram of selected communications concepts used to describe the data link layer of an application in terms of ontology classes.

As shown in FIG. 4, services of the data link layer 204 deal with the data exchange above the physical layer 202. Issues addressed in the data link layer can be defined, for example, through the ontology classes "Flow Control" 402, "Error Handling" 404, "Data Exchange" 406, and "Media Access Control" 408.

An optional high-level ontology class is "Flow Control" 402. Flow control mechanisms of a component can be categorized by the subclasses "Rate-Based" 410 and "Credit-Based" 412. Credit-based control systems ensure that no more data is sent than the receiver is ready to obtain. If the receiver's buffer is very limited, this strategy may be preferred and form a requirement in the application constraints. Consequently, the subclasses "Credit Based" 412 and "Rate Based" 410 can be included as subclasses for the class "Flow Control" 402. However, the "Flow Control" class is not mandatory, as communication between two components can be performed without it.

Another optional service class is "Error Handling" 404. For example, errors may be dealt with in the data link layer in several general ways. For instance, redundant coding can be employed to enable data recovery mechanisms 414, or different services may just detect errors and discard the message to avoid corrupted data 416, or data may explicitly be requested again if corruption is detected 418. As these different strategies affect the quality of service they are likely subject to non-functional application constraints and are therefore included in the model.

The "Data Exchange" 406 class can be a mandatory class of the data link layer 204, because its subclasses define details about the communication strategy between different components. The main subclasses of the Data Exchange class are "Connection-Orientated" 420 and "Connectionless" 422 communication, the choice of which can affect issues of latency, same order delivery, and completeness. The "Connectionless" subclass 420 can be further defined in terms of whether the data exchange is "Acknowledged" 424 or "Unacknowledged" 426, and, if the latter, whether the exchange is "Broadcasting" 428.

The class "Medium Access Control" 408 addresses issues of collision detection 430 and collision handling 432. Additionally, if the collision detection 430 can be carried out through data evaluation schemes 434 or carrier sensing 436, and collision handling 432 can involve probabilistic methods 438 or deterministic methods 440.

Figure 5:
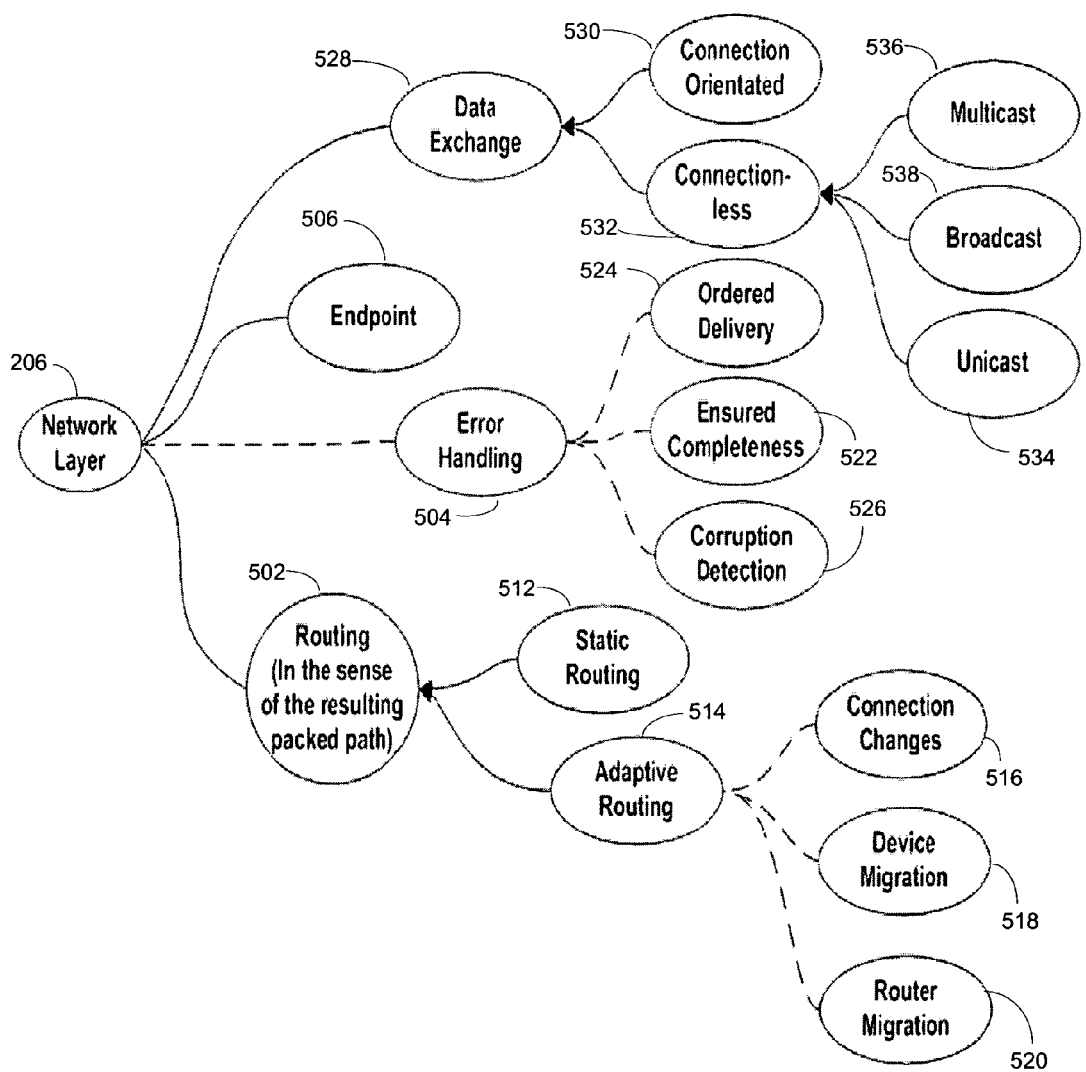
FIG. 5 is a block diagram of selected communications concepts used to describe the network layer of an application in terms of ontology classes.

As shown in FIG. 5, the network layer 206 relates to the transport of information through a communication network. In contrast to the lower layers 202 and 204 of the OSI model 200, in the network layer a connection can be realized as spanning multiple hops. That is, communicating parties may not have a direct physical link between each other but can be connected though a chain of interlinked components. Services in the network layer 206 enable data packages to travel trough this chain from an origin to a desired destination. For the interface model, the ontological classes "Routing" 502 "Error Handing" 504 and "Endpoint" 506 can be defined.

A primary task of the network layer, as characterized by the "Routing" class 502, is to define the package routing. Additional subclasses of "Routing" can include "Static Routing" 512 to indicate that a routing scheme is fixed and "Adaptive Routing" 514 to indicate that the routing scheme can change. While mechanisms of the first subclass can only be employed in static networks, the "Adaptive Routing" class 514 represents a way to adapt to network changes. The "Adaptive Routing" class 514 can be further described by the classes "Connection Changes" 516 "Device Migration" 518 and "Router Migration" 520. The subclass "Connection Changes" 516 represents a way to react to changing connectivity between peers, which permits finding new routes if the networks congest on certain links or if connections break down. Technologies of the subclass "Device Migration" 518 are used when devices can move from one network gateway to another, for example, when a cell phone roams from one gateway to another. The class "Router Migration" 520 covers technologies that allow routers to migrate in the network, which is especially useful in ad-hoc mesh networks where routers are dynamic components.

Error handling 504 of the network layer is usually employed to ensure completeness in data transfer or to preserve the order of packages traveling different routes through the network. These aspects are represented by the subclasses "Ensured Completeness" 522 and "Ordered Delivery" 524. Protocols of the network layer may also check the delivered data for corruption, and, therefore, the subclass "Corruption Detection" 526 is included in the conceptual model.

Issues of data transportation in the network layer are described by the class "Data Exchange" 528. As in the data link layer 204, this class has the two subclasses "Connection Orientated" 530 and "Connectionless" 532 that represent the equally named communication strategies. On this abstraction level, addressing mechanisms can have a significant influence on communication possibilities in the network, and, therefore, the addressing subclasses "Unicast" 534, "Multicast" 536, and "Broadcast" 538 are included as subclasses of "Connectionless" 532.

Processes using protocols of the subclass "Unicast" 534 can transfer information to one specific resource at a time. In contrast, protocols in the subclass "Broadcast" 538 can be used to send information to all participants of the network. The "Multicast" subclass 536 represents protocols that are similar to broadcast protocols, but the multicast protocols can send information to a dedicated subset of all networks members.

The class "Endpoint" 506 holds all possible endpoints of communication. This refers to the addressing scheme used in the network, e.g., for the IP protocol "Endpoint" is the class of all IP addresses.

Figure 6:
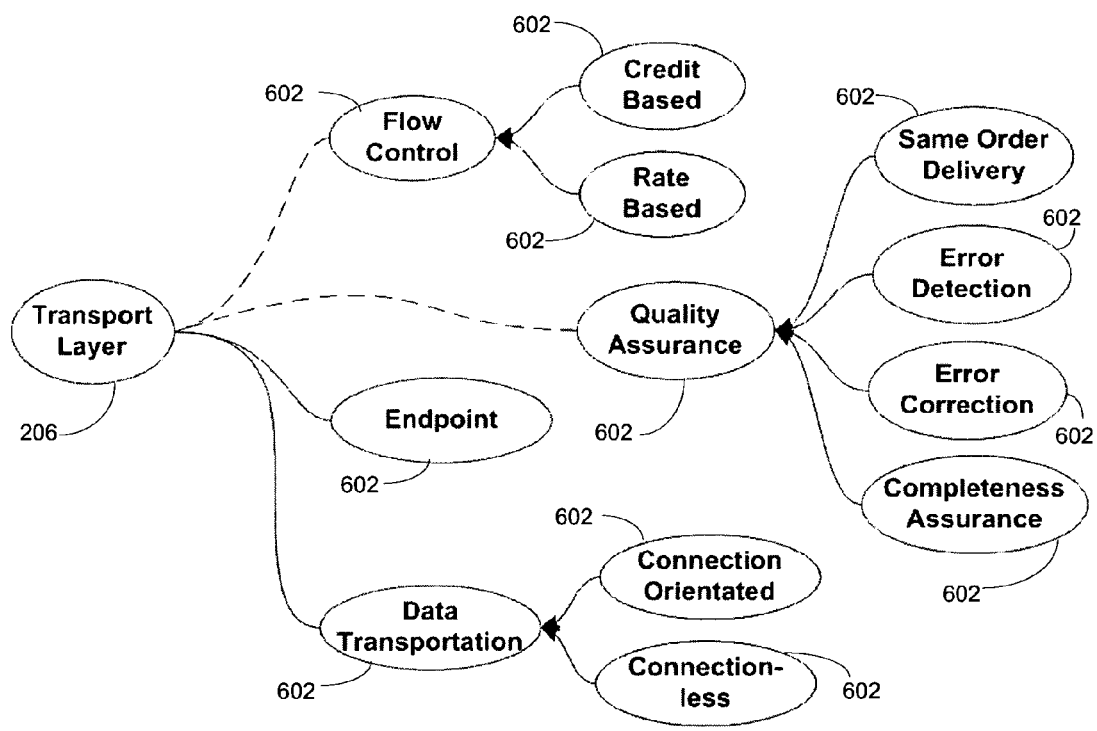
FIG. 6 is a block diagram of selected communications concepts used to describe the transport layer of an application in terms of ontology classes.

The transport layer 208 is built on top of the network layer 206, and provides connectivity from end-to-end across a network. Services provided in the transport layer can be found in the network layer as well, however, the level of abstraction in the two layers is different. Using functionality of the network layer 206, services of the transport layer 208 only need to run on the machines at the connections endpoints and do not affect routers. As shown in FIG. 6, the transport layer 208 includes the classes "Endpoint" 602, "Error Handling" 604 and "Data Transportation" 606.

The class "Endpoint" 602 holds all possible endpoints of communications and is similar to the equally named class in the network layer 206. This class refers to the addressing scheme used for virtual connection endpoints for applications, e.g., for the TCP protocol, "Endpoint" is the class of all TCP ports. As on the network layer 206, error handling on the transport layer 208 may ensure the same order delivery and completeness of data transfer or detect data corruptions.

In terms of functionality, the concepts of the class "Flow Control" 604 are similar to those of flow control mechanisms found in the data link layer 604, which is natural because both layers handle point-to-point connections: the data link layer 604 handles point-to-point connections on a physical level while the transport layer 608 handles point-to-point connections on a logical level. Thus, like the "Flow Control" class 402 on the data link layer 204, the "Flow Control" class 604 in the transport layer 208 includes subclasses "Credit Based" and "Rule Based."

The class "Data Transportation" 606 refers to communication strategies that may be employed in the transport layer. The two subclasses "Connection Orientated" and "Connectionless" correspond to the subclasses of the same names at lower layers (e.g. subclasses 420 and 422 in the data link layer 204 and subclasses 540 and 542 in the network layer 206.

Although several ontological classes and subclasses have been described, many other classes and subclasses are possible and can be defined and used in the composition and validation model.

Referring again to FIG. 2, it is evident that communication issues are addressed in the lower four OSI-Layers 202-208 of the model 200. The session layer 210, the presentation layer 212, and the application layer 214 refer to higher levels of abstraction, which generally deal with matters of application semantics. Consequently the composition model described herein focuses on the lower level communication issues, while being open for extensions on higher levels.

Using the concepts of components described herein (e.g., with reference to FIG. 1) and of communications on different layers of abstraction (e.g., with reference to FIGS. 2-6) along with the concepts of the top-level ontology that are used to create the interface descriptions, a composition model that is tailored to ubiquitous computing systems (e.g., smart item applications) is described in further detail below.

In component oriented architectures a system is modeled as a composition of components. Components encapsulate functionality and provide well defined interfaces, called ports, between components. Composition of a system from components can be achieved with interaction components ("connectors"), which interlink ports of the respective components. Because components can interact across device boundaries, the composition is influenced by communication issues due to software capabilities as well as by the utilized hardware. Therefore, the communication abilities of the individual components and groups of components are reflected in a component model to address such issues. In the model, consideration of interoperability of a multi-component system addresses communication issues at all protocol layers, including the physical layer, is accounted for. Thus, ports, connectors, components are modeled in rich detail (e.g., with metadata describing their aspects, properties, capabilities, and instances) to cope with the issues of the smart item domain. These enhanced representations of ports, connectors, and components can affect how an application is composed based on the model (i.e., how semantic aspects of the building blocks of the model are instantiated, enveloped, and combined in the composition process).

Because a smart items infrastructure uses many different components and interaction mechanisms (e.g., RFID-Chips using purpose build protocols and dedicated frequencies and PDA's implementing the IEEE 802.11 standard for wireless networks) and compatibility between the components cannot be assumed, ports, connectors, and components (i.e., the building blocks of the composition model) are modeled as "information rich" components that account for hardware, software, and communications protocols that are relevant to the component and to a composition of two or more components.

Figure 7:
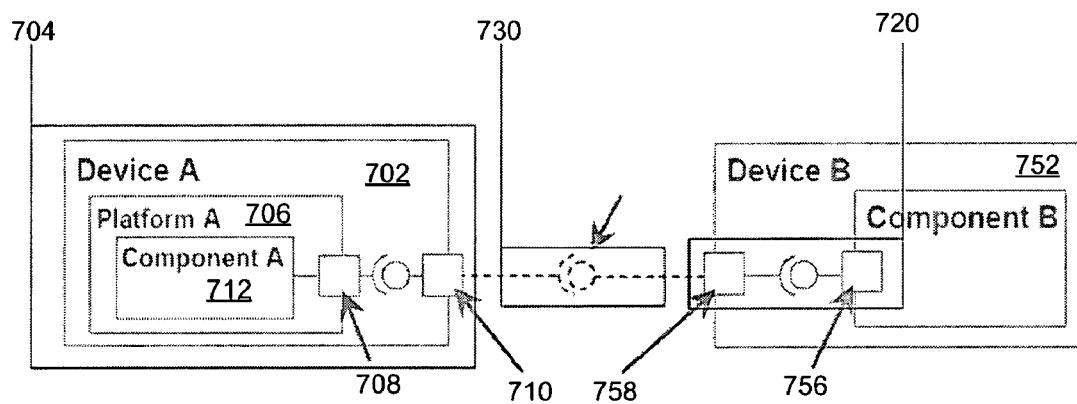
FIG. 7 is a block diagram of a component, a port, and a connector used in a composition model.

Referring to FIG. 7, when connecting a first device 702 and a second device 752, the device interfaces wrap the ports of the components as illustrated in FIG. 7. Hence, a connection between Device 702 and Device 752 builds upon communication abilities implemented on the hosting devices, which are determined by the device hardware as well as by the software running on the device. To account for such interaction aspects, in the composition model, components, ports, and connectors are modeled as having rich features that describe details of the components', ports', and connectors' functions and capabilities as they relate to a smart items infrastructure.

For example, a component 704 can represent a software component 712 (e.g., a service), a platform that may be in place 706 (e.g., an operating systems), a device 702, a software port 708, a device port 710, or a nested combination of those entities. A port 720 can have the combined communication abilities of all component parts from which it is assembled, i.e., a port for Device 752 can include information about a software port 756 and a device port 758 used by the Device. A connector 730 describes a connection between "ports" and can be understood as a concrete instantiation of a communication channel in the target setting, as described in more detail below.

A port 708, 710, 756, and 758 represents an interface to a component, and many properties can be defined to model a port. For example, a port 756 can be a software port and a port 758 can be a device port, and the mapping of this ontological concept to a property of the port can be described formally by the function, has_type, which is defined as has_type: PRT→{"software", "device"}. In another example, ports 708, 710, 756, and 758 can have a direction of data flow that they allow (e.g., "in," "out," or "bidirectional"), and a mapping of this concept to a property of the port can be formally described by the function has_dataflow, which is defined as has_dataflow: PRT→{"in", "out", "bidirectional" }. Many other additional properties can be defined for a port and the properties are used to bind semantic extensions to the port description, which can be denoted by properties (e.g., as stored in metadata for a port) that describe realizations of communication concepts. For example, the concept that a port operates as a mobile phone gateway can be expressed though the ontological classes "Communication Medium," "Wireless," and "EM Waves" and a model of the mobile phone gateway port can be imbued with metadata properties to indicate that the port represents the concept accurately. To ensure accuracy of the composition model, it is necessary that every required concept for the port is realized (e.g., by defining a metadata value corresponding to the concept). Realization may be required at the direct binding of the port metadata to the metadata of another port, component, or connection or binding can occur at a higher protocol level.

Such mappings from communication concepts to port metadata can be used to specify how a particular port can be employed in a connection, i.e., which technology can be used to bind the port to another component. For example, when modeling a system composed of multiple embedded devices, one component of the system could be a sensor operating in a low-power, transmit only, mode, and other components could be a first hard-wired, low-power controller and a second configurable controller that can distribute code to a sensor. The metadata of the ports for the sensor and the first controller could indicate that the communication protocols of the sensor's port match those of the first controller's port when operated in a low-power mode, such that the controller can be linked to the sensor to receive data from the sensor. In contrast, the metadata of the port for the second controller could indicate that communication with the sensor is not possible at all or is not possible when the controller is used in a low-power state. Thus, using the metadata of the components and their ports, the sensor-controller compatibility is determined at a communications and instance level rather than (or in addition to) at a type level. In another example, in wireless communication, the binding technology can be determined by concepts such as communication frequency, modulation technique, handshaking protocols, etc. Hence, metadata referring to the properties of a port are associated with the concepts to ensure valid bindings in compositions.

A component 704 can either be a software component, middleware (e.g., an operating system), a device, or a combination of these elements. Two or more components can be merged together to form a combination, and a new interface is provided to access the component resulting from the combination. For example, the software application component 706 and the platform component 712 can be merged and the interface of the resulting combination component can be a port 708.

When modeling a system or application composed of multiple components, the component model used to validate the composition plan holds all types of components which are part of the modeled system or application, i.e., all software component types (including middleware) and all device component types. A type itself is defined as a set of all components with identical properties. For instance, two RFID tags of the same class or two PDAs with the same hardware would be of the same device component type. However, instantiations of components are related to concrete devices or deployed copies of software, so two components of the same type could be different at the instance level in the modeled system or application.

A component 704 provides a set of ports with which it can interface with other components. Formally, this can be expressed as mapping components to sets of ports. Thus, when considering interoperability of components in the modeled systems, component types can be analyzed in terms of the group of ports to which the components map.

A connector 730 can be used in the model to interlink components. Thus, connectors represent the abstract concept of a communication channel that is instantiated by making actual use of this channel in a composite application. The instance of a connector points to the source and the destination of the respective connection, and this information can be stored as metadata associated with the connector. Additional metadata for a connector 703 can be obtained from the properties of ports linked with the connector. For example, a wireless connector requires that the ports to which it is linked have the ability to communicate wirelessly.

Components 704, ports 720, and connectors 730 contain deep hierarchies of communication concepts and subconcepts and thereby can be used as the fundamental building blocks of composition models of ubiquitous computing applications, which can be used to verify the viability of a proposed application. In addition to using definitions of the fundamental communication details of each component, port, and connector to model the application, higher-level concepts can be defined to represent parts of the application. Such higher-level concepts can be defined in terms of "Specifications," which represent a predefined set of concepts and values for properties describing those concepts. Thus, "Specifications" can be used in a model of the application to achieve a certain level of abstraction in the interface description and instead of splitting up a communications concept into more detailed subconcepts, the specification can be used to describe the characteristics of the concept and the subconcepts. For example, a specification, "EPCglobal" can be defined to represent communication aspects of RFID tags, such as communication frequency and signal coding of RFID tags used in a smart items infrastructure.

Figure 8A:
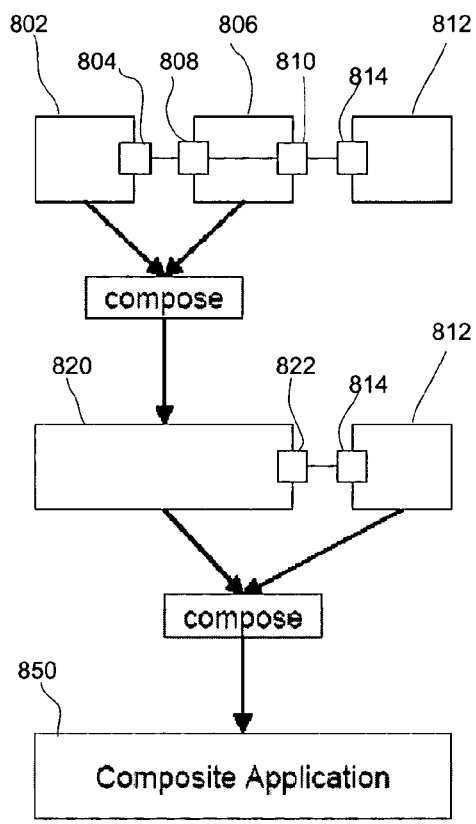
FIG. 8A is a flow-chart of a process for composing a composite application from constituent components.
Figure 8B:
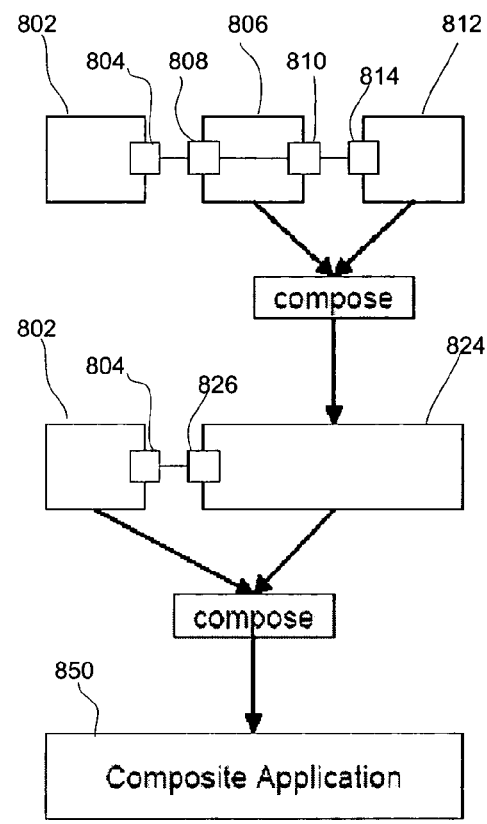
FIG. 8B is a flow-chart of a process for composing a composite application from constituent components.

Referring to FIGS. 8A and 8B, a model of a composite application can be constructed from individual component models (i.e., the component 704, port 720, and connector 730 building blocks) of the constituents of the application. A composition plan for combining the individual component models is constructed and then the composite application model is created by successively composing components that are linked in the composition plan. Thus, as shown in FIG. 8A, a first component 802 can have a port 804. A second component 806 can have a first port 808 that is to be connected to port 804 and a second port 810. A third component 812 can have a port 814 that is to be connected to the port 810. A composition plan can specify a two-step process for creating a composition model 850: first, a component model 820 having a port 822 is composed from the components 802 and 806; and second, the composition model 850 is composed from the component model 820 and the component 812. Alternatively, as shown in FIG. 8B, a composition plan can specify the composition model 850 be created by composing a component model 824 having a port 826 from components 806 and 810, and then composing the composition model 850 from the component model 824 and the component 802. Although shown in FIGS. 8A and 8B as existing at the instance level, a composition plan can exist at the type level as well as on an instance level.

Using a composition plan as described with reference to FIGS. 8A and 8B, complex compositions can be created by successively composing compound components from constituent components. A compound component is composed from multiple individual components, and the resulting component model merges the connected ports of the individual components and acquires an interface description that includes the properties of the ports of the individual components. Consequently, mappings of communications concepts to component properties are generally different in the resulting component than they are in the individual component. For example, properties relating to the connection between the merged individual components are not included as part of the composition plan of the composition of the individual components.

To determine the properties needed to model the communication concepts of a component composed of individual components, two cases must be considered. In the first case, referring to FIG. 9A, an individual component 900 having ports 902, 904, and 906 can be combined with a component 910 having ports 912, 914, and 916. When the interlinked ports 902 and 912 of the individual components can only bind one connection, then the set of interface ports for the resulting composite component 920 is defined by pooling the interfaces of the constituent components 900 and 910, excluding the ports to bind. Thus, as shown in FIG. 9A, the resulting component is defined by the properties of the ports 904, 906, 914, and 916. In the second case, as shown in FIG. 9B, the connected ports 902 and 912 can handle multiple connections. In such a case, the port 912 remains part of the interface in the component 920 resulting from the composition and is not changed by the composition. Instead, a duplicate port 912' is created and is used in the composition 920. The port 912' is different from 912 only in its identity, but otherwise the ports 912 and 912' are defined by the same properties.

When composing composite components, only valid compositions are created, as determined by checking composition compatibility rules during the composition process. Additional verifications of the composition process address additional well-formedness rules and application constraints. All these rules are checked when two components are linked together. Consequently, verification is part of the operations conducted by during the composition process.

Compatibility rules determine whether or not two ports can be linked together. Thus, to establish a direct link between devices the properties required for communication between components linked in the composition plan must exist at the ports that are to be linked according to the composition plan. For device ports, these properties are the properties of the lower three OSI layers. Thus, if one port requires a concrete realization of a certain property, this realization must be available at the other port as well.

In the composition model, availability of a realization can be expressed in two ways. In one way, a realization can be explicitly related to a component by the relation. For example, the properties defined in the metadata of a port may indicate that the port communicates on carrier frequency of 2.4 GHz. In another way, the respective realization can be defined by a specification to which the component conforms. For example, the properties defined in the metadata of a port may indicate that the port communicates using the 802.11(g) standard.

To check that two reflexive ports linked in a composition plan satisfy these compatibility rules and therefore can be linked in the composition model, every communication aspect and every defined realization of a communication aspect denoted as required by a port must be provided by the corresponding linked port. In the case of non-reflexive compatible aspects, the compatibility of ports can be verified by considering whether the linked ports are valid counterparts of each other. For example, a port that provides "One Way" "In" communication can be a valid counterpart of a port that provides "One Way" "Out" communication. Thus, in one implementation, a port of a radio station that broadcasts out one-way can be a valid counterpart of a port of a radio receiver that receives one-way communication in.

The composition model may also claim constraints that are to be met by a connection between two logical endpoints (i.e., the two most distant ports in a chain of interlinked delegation ports) in the composition. For example, a constraint for an end-to-end connection may be that delivered data packages are ensured to be in the correct order or that corruption checking is in place. Such a constraint can be set for a component port corresponding to a logical endpoint in the composition plan and aspects with the claimed semantics can be checked regarding presence. Following the chain of connections at each link in the composition plan, a realization for the claimed concept (e.g., that the connection is checked for data corruption) can be found.

Well-formedness rules are used in the composition model to verify that communication in a composite application is sufficiently described. Thus, if a communication concept, c, is defined by a property associated with a component in the composition plan, other properties for concept classes that the communication concept, c, depends on must be defined as well. For example, if a port specifies a TCP connection, for the composite application to be well-formed, a network protocol (such as IP) would have to be in place for the component to communicate.

Relationships between classes representing different communications concepts can be defined using a hierarchy among the classes that follows the OSI-layers 202-214. For example, a property of a port defined as a type of data link in OSI layer 204 (e.g., a TCP connection) can be defined to depend from a property (e.g., an IP protocol for data exchange over a network) that is part of the higher network OSI layer 206. Then, when the well-formedness of the composition plan is being checked, the dependency of the TP connection property for a port can be checked against the property from which it depends (i.e., the IP protocol property of the network).

In addition to verifying the composition model at the type level, the model can also be verified at the instance level if a concrete mapping to instances of the modeled components is known. To allow for such checks at the instance level the model should describe details about the physical conditions and environment in which the application is supposed to run. For example, the positions of devices and their locations can influence device-to-device connectivity. In a particular example, if two devices using radio frequency communication are known to be separated by a metallic object, verification at the instance level would indicate that the two devices cannot communicate due to the barrier, even though they are otherwise perfectly compatible with each other. In another particular example, two radio-frequency communication devices might be separated by a physical distance that is too large for communication to take place over.

When modeling a composite application at the instance level, the instantiated model of the application is a refinement of its model at type level. Consequently, it represents at least the same information that is provided by the respective type level model. Thus, in an instantiated model, for each mapping, m, between port properties and communications concepts, a mapping, $m_i$, exists, which denotes the same relation on instance level. In an instantiated model an instance exists for each component type and port in the respective type level composition model, the instance includes all the information of the type plus additional instance-specific information. Instantiated connectors mark a concrete link between two selected devices.

Thus, constraints on the composition model can result from limitations in the target setting of the application. For example, a certain communication channel may be restricted by legal means or security policies (e.g., certain wireless RFID readers may be able to work in Europe but not in the US because of different regulations regarding allowable signal strengths of the interrogation signals in the different jurisdictions), and constraints of this kind can affect the connectors that can be validated. This implies that a composition plan that is valid in one target setting may be invalid in another setting.

When validating a composition model on the instance level a number of different rules can be used to validate the model. A rule can be used to check if all communication concepts used in a connection are explicitly defined as viable in the target setting. For example, a target setting may require that devices communicate using the 802.11(g) standard, and this rule can verify that the component of the model adhere to this explicit definition. Another rule can be used to check if values specified for communication concepts used in a connection are defined as viable in the target setting. For example, a target setting can require that devices communicate using a particular wireless frequency, and this rule can verify that the components of the model can operate on this frequency.

Another rule can be used to verify, on the instance level, if the communication concepts used by a concrete instance of a connector are explicitly specified as viable for this connector. For example, the target setting may require that the connector be UL® approved, and this rule can verify that the connector satisfies this requirement. Another rule can be used to verify, on the instance level, if the values defined for communication concepts used by a concrete instance of a connector are explicitly specified as viable for this connector. For example, the target setting may require that a certain gauge wire be used to carry signals between two devices, and this rule can verify that the components of the model are connected by such a gauge wire.

In addition, rule can be used to check if all communication concepts used in a connection are explicitly defined as not viable in the target setting. For example, a target setting may require that devices not communicate using the 802.11(g)

standard, and this rule can verify the component of the model adhere to this explicit definition. A rule can be used to check if values specified for communication concepts used in a connection are defined as not viable in the target setting. For example, a target setting can require that devices communicate without using a particular wireless frequency, and this rule can verify that the components of the model adhere to this explicit definition.

Another rule can be used to verify, on the instance level, if the communication concepts used by a concrete instance of a connector are explicitly specified as not viable for this connector. For example, the target setting may require that the connector not be placed underground, and this rule can verify that the connector satisfies this requirement. Another rule can be used to verify, on the instance level, if the values defined for communication concepts used by a concrete instance of a connector are explicitly specified as not viable for this connector. For example, the target setting may require that a wire no smaller than a certain gauge be used to carry signals between two devices, and this rule can verify that the components of the model are connected by such a gauge wire.

Figure 10:
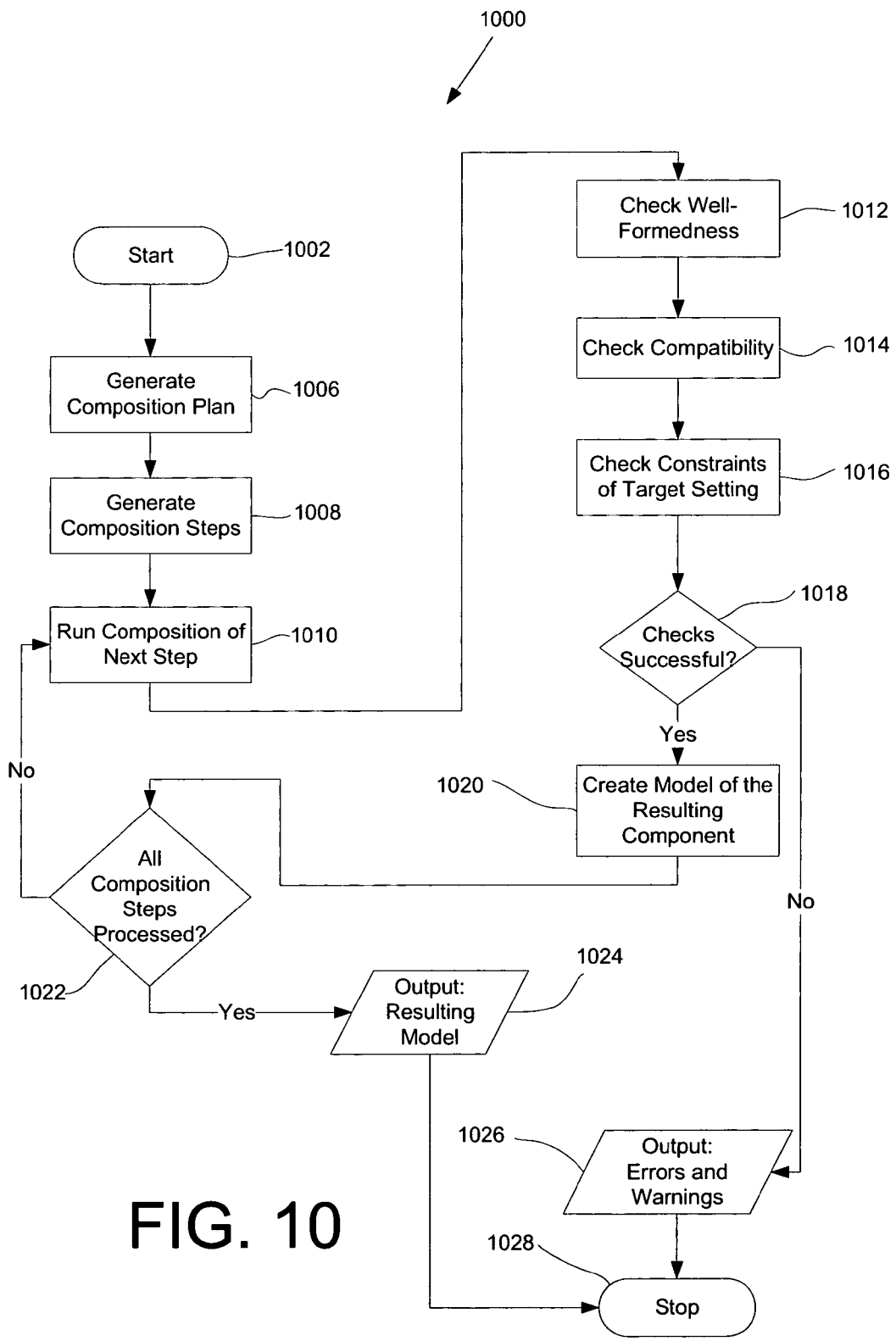
FIG. 10 is a flow-chart of a process for composing and verifying a composite model from constituent components.

As shown in FIG. 10, a process 1000 for modeling an application composed of individual components, ports, and connectors and verifying the model begins at step 1002. Data models of the components, ports, and connectors that the verification and composition algorithms can work on are created (step 1004). The data models describe properties of the components, ports, and connectors that represent the communication ontology that describes details about communication technologies required in the application. The data models can be formulated in metadata for the components, ports, and connectors, and any general ontology representation language (e.g., RDF or OWL) can be used to generate the metadata.

After the data models are created, a composition plan is generated (step 1006), and the individual steps of the composition plan are generated (step 1008). After a composition plan has been defined a compound component is composed from a model of two individual components and their ports (step 1010). For each composition step, the well-formedness of the compound component is checked (step 1012) to verify that all aspects of communication are specified sufficiently.

The compatibility of the linked ports is checked (step 1014), and the port descriptions of the resulting compound component are derived (step 1014). Next, constraints defined for the desired target setting are checked (step 1016), including restrictions defined for communication channels a certain application may use. Also, global policies or limitations of the device ecosystem are taken into account during the checking in this step. If the compound component is well-founded and the constraints of the target setting are satisfied (query 1018) the a compound component is created from the individual components (step 1020). If the query 1018 is not satisfied, then errors and/or warnings are output (step 1026), and the process ends (terminal 1028). However, if the query 1018 is satisfied, then if all composition steps of the composition plan have not been processed (query 1022), a composition of the next step of the composition plan is run (step 1010). If all the steps of the composition plan have been processed (query 1022), then the resulting composition model is output (step 1024), and the process ends.

Figure 11:
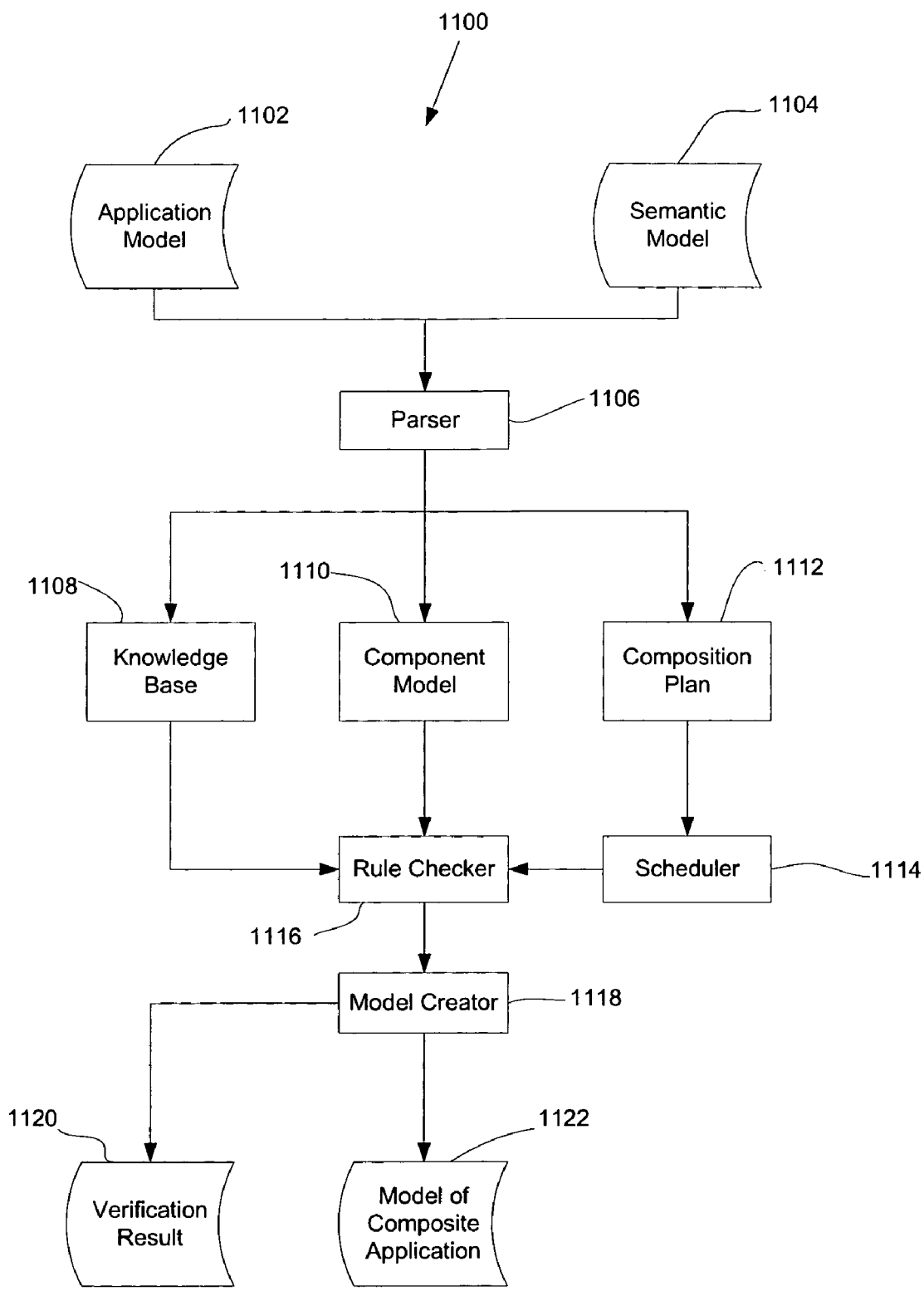
FIG. 11 is a block diagram of a system for composing and verifying a composite model from constituent components.

As shown in FIG. 11, the components of a system 1100 for modeling and verifying a composite application include an application model 1102 containing metadata describing components, information about the applications target setting, the application constraints, and a composition plan. The system also includes a semantic model 1104 of the ontology describing communication concepts and relations between ports used in the application model 1102. Knowledge about specifications for communication technologies can be stored in both the application model 1102 and the semantic model 1104 as well.

The application model 1102 and the semantic model 1104 can be input to a parser 1106, which creates in-memory representations of the input data. Within the in-memory representation, different kinds of in-memory data are stored in a Knowledge Base 1108, one or more Component Models 1110, and one or more Composition Plans 1112. The Knowledge Base 1108 holds exchangeable parts of the knowledge required of the verification, i.e., the interaction ontology and the model of the target setting including the respective constraints and specifications.

A scheduler 1114 receives input from the composition plan 1112 and determines the order in which composite components are created and checked. A rule checker engine 1116 receives input from the knowledge base 1108, the component model 1110, and the scheduler 1114 and checks whether the component models satisfy certain consistency and well-formedness rules and target-specific constraints.

The results created by the rule checker 1116 are transformed by a model creator 1118 to the desired output format, which can be adapted to a selected composition language of choice, e.g., a language that matches the descriptions of components used as input to the model. Additionally, verification results 1120 can be output in a format best suited for the desired purpose. For example, when used in an development environment, the verification results 1120 can be output in human readable error messages, and when used in automatic composition tools, the verification results 1120 must be output in a machine-readable format.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of modeling a component-based, distributed application, wherein the method is performed by computer executable instructions executing on a processor, the method comprising:
    modeling of a plurality of components of the application, wherein a component includes a software service or module, a computational device, or communications middleware, each model of a component including an interface to other model components, the interface characterized by one or more model interface ports, the model interface ports describing communication technologies and protocols used by the component to communicate with one or more other components, wherein the modeling includes generating the of model interface ports for the models of the components of the component-based application;
    modeling end-to-end communications concepts of the endpoint class components at ends of a communications pathway through interlinked components, wherein an endpoint class component is a component at an endpoint of a network layer addressing scheme for the communications pathway;
    modeling a plan for interlinking the components of the application;
    modeling communications capabilities of a compound component composed of a plurality of constituent components, wherein the modeling of the communications capabilities of a compound component includes merging models of interface ports of the constituent components and modeling communication capabilities of types of components; and
    determining if the interlinked components are compatible to communicate validly in the application, wherein the determination includes determining if the communication technologies modeled by the types of components are compatible.

2. The method of claim 1, wherein the components comprise heterogeneous computational devices.

3. The method of claim 2, wherein the heterogeneous computational devices comprise RFID devices.

4. The method of claim 1, further comprising determining if the compound component is well-formed.

5. The method of claim 1, wherein modeling communication capabilities of components of the application comprises mapping a communication concept to a property associated with the component.

6. The method of claim 1, further comprising determining if the end-to-end communications concepts of the components at the ends of the pathway are compatible.

7. The method of claim 1, wherein
    modeling communication capabilities of components of the application comprises modeling communication capabilities of instances of components; and
    wherein determining if interlinked components are compatible to communicate validly in the application comprises determining if the instances of components are compatible.

8. The method of claim 1, further comprising associating a communication capability with an OSI layer.

9. A system for modeling a component-based, distributed application, the system comprising:
    a storage device comprising:
    models components of the application, wherein a component includes a software service or module, a computational device, or communications middleware, each model of a component including an interface to other model components, the interface characterized by one or more model interface ports, the model interface ports describing communication technologies and protocols used by the component to communicate with one or more other components, and
    a model of a plan for interlinking components of the application, and
    models of end-to-end communications concepts of endpoint class components at ends of a communications pathway through interlinked components, wherein an endpoint class component is a component at an endpoint of a network layer addressing scheme for the communications pathway; and a processor, wherein the processor is configured to:
    model communications capabilities of a compound component composed of a plurality of constituent components, wherein the modeling includes merging models of interface ports of the constituent components and modeling communication capabilities of types of components, and
    generate a model of an interface port of the compound component, and determine if the interlinked components are compatible to communicate validly in the application, wherein the determining includes determining if the communication technologies modeled by the types of components are compatible.

10. The system of claim 9, wherein the components comprise heterogeneous computational devices.

11. The system of claim 10, wherein the heterogeneous computational devices comprise RFID devices.

12. The system of claim 9, wherein the processor is further configured to determine if the compound component is well-formed.

13. The system of claim 9, wherein the processor is further configured to determine if the end-to-end communications concepts of the components at the ends of the pathway are compatible.

14. The system of claim 9,
wherein the processor is configured model communication capabilities of instances of components to model communication capabilities of components of the application; and
wherein the processor is configured to determine if interlinked components are compatible to communicate validly to determine if the instances of components are compatible.

* * * * *